United States Patent
Braun

[11] Patent Number: 5,623,517
[45] Date of Patent: Apr. 22, 1997

[54] TRANSMISSION SYSTEM WITH IMPROVED DECODING OF A BLOCK CODE

[75] Inventor: Volker Braun, Kirkel, Germany

[73] Assignee: U.S. Philips Corporation, New York, N.Y.

[21] Appl. No.: 493,035

[22] Filed: Jun. 21, 1995

[30] Foreign Application Priority Data

Jun. 21, 1994 [EP] European Pat. Off. ............. 94201764

[51] Int. Cl.$^6$ ............................ H04L 25/34; H04L 25/49
[52] U.S. Cl. ...................... 375/262; 371/37.1; 375/264; 375/292
[58] Field of Search ................................. 375/286, 288, 375/292, 317, 319, 365, 265, 341, 340, 242, 259, 261, 262, 263, 264; 371/37.1, 37.4, 37.8, 37.9, 38.1, 39.1, 40.1, 41, 43; 341/173, 50, 51; 360/50, 48; 364/514, 534, 734, 812; 332/103, 104, 108, 115

[56] References Cited

U.S. PATENT DOCUMENTS

| | | | |
|---|---|---|---|
| 4,606,028 | 8/1986 | Wagenmakers | 371/49 |
| 4,620,311 | 10/1986 | Immink | 375/292 |
| 4,933,956 | 6/1990 | Forney, Jr. | 375/94 |
| 5,040,191 | 8/1991 | Forney, Jr. et al. | 375/262 |
| 5,267,098 | 11/1993 | Lokhoff | 360/50 |
| 5,375,171 | 12/1994 | Dewolf et al. | 380/49 |

*Primary Examiner*—Tesfaldet Bocure
*Assistant Examiner*—Bryan Webster
*Attorney, Agent, or Firm*—Steven R. Biren

[57] ABSTRACT

In a transmission system or a recording systems often codes are used to make the coded signal ($C_k$) DC free. To simplify the detector (16), block codes can be preferable. To exploit the redundancy inherently present in such a code a symbol wise Viterbi detector (24,26) is used to detect the symbols without largely enlarging the complexity of the system.

9 Claims, 6 Drawing Sheets

TRANSMISSION SYSTEM WITH IMPROVED DECODING OF A BLOCK CODE

BACKGROUND OF THE INVENTION

1. Field of the Invention

The invention is related to a transmission system comprising a transmitter for deriving words of coded data symbols from input data symbols, and for applying a coded signal derived from the words of coded data symbols to a transmission channel, a receiver for receiving the coded signal from the transmission channel comprising a decoder for deriving said words of coded data symbols from the received coded signal

2. Description of the Prior Art

The invention is also related to a recording system and a receiver.

A transmission system according to the preamble is known from U.S. Pat. No. 4,620,311.

Such transmission system can e.g. be applied for the transmission of digital symbols via the public telephone network, for the transmission of multiplex signals between exchanges or for the transmission of digital signals in mobile radio systems. Said recording systems can be used for the recording and reproduction of digital symbols using magnetic tapes or magnetic discs such as hard discs or floppy discs. Said recording system can also be used with optical or opto-magnetic discs.

In order to transmit the input data symbols via the transmission channel, said input data symbols are often transformed into coded data symbols by the transmitter. Coding is performed in order to obtain certain desired properties of the frequency spectrum of the coded signal. An often desired property of the frequency spectrum of the coded data signal is that it does not contain any DC component, because a number of common transmission channels are not able to pass DC. Another reason for coding the input signal is to obtain the possibility of correction of transmission errors. These transmission errors can be caused by thermal noise and all kinds of interference.

To enable the use of a relatively easy decoder often so-called block codes are used. In such a block code, words of input data symbols are transformed into words of coded data symbols. In the block code according to the above mentioned U.S. patent, the words of input data symbols comprise 8 bits, and the block of coded data symbols comprises 10 bits.

In the prior art system the words of coded data symbols are derived from the coded data signal by slicing said coded data signal. In this way an optimum performance can not be obtained because the redundancy present in the words of coded symbols is not exploited for reduction of the error rate.

SUMMARY OF THE INVENTION

The object of the present invention is to provide a transmission system in which the redundancy present in the coded data words is exploited to reduce the error rate.

Therefore the transmission system according to the invention is characterised in that the decoder is arranged for determining a most likely word of coded data by symbol like expanding candidate words of coded data symbols using likelihood measures corresponding to each of said candidate words of coded data symbols, each likelihood measure being derived from the received coded signal.

By determining the most likely codeword by symbol like expansion candidate words of coded data symbols having an associated probability measure, the redundancy inherently present in the words of coded data symbols is utilised. A straightforward way to exploit the redundancy in the words of coded symbols would be the use of a word wise Viterbi detector. For the code according to the above mentioned U.S. patent, 423 different words of coded data symbols exist. If it is assumed that the two most likely sequence of words of coded data symbols are determined, the calculation of the probability measure of said sequence would require n additions for each distinct word of coded data symbols. If n is equal to 10, 4230 additions would be required.

If symbol like extension of the candidate words of coded data symbols is used, only a few distinct extensions are possible. If the number of candidate sequences is equal to 3, the possible number of extensions is never more than 6 if binary symbols are used. In most cases this number is even lower due to the impossibility of some transitions. With 5 possible transitions, the total number of additions required for calculating the probability measures is 50, being substantially lower than the 4230 additions needed if a word wise detection is used.

It is observed that in the paper "On the Performance; of a Rate 8/10 Matched Spectral Null Code for Class-4 Partial Response" in IEEE Transactions on Magnetics, vol. MAG-28, No. 5, pp 2883–2888, September 1992, a Viterbi detector having a reduced complexity with respect to a word wise Viterbi detector is disclosed. However this reduced complexity Viterbi detector does not make use of symbol wise detection of the received signal, according to the present invention.

An embodiment of the invention is characterised in that a running digital sum of the coded data symbols is bounded between a finite minimum and maximum value, and in that the number of candidate words of coded data symbols is smaller than or equal to the number N of different values of the running digital sum, and in that each candidate word of coded data symbols corresponds to a different value of the running digital sum.

A large class of DC free codes are designed to keep a so called running digital sum within specified bounds. The running digital sum RDS is defined as the sum of all past symbol values, under the assumption that the symbols can assume positive and negative values.

A possible choice of the number of candidate words of coded data symbols is smaller or equal to the number of different values for the running digital sum. An equal number of candidate words of coded symbols and running digital sum values is possible if all values of the running digital sum are possible at all instants. This will be in general the case for ternary codes such as the FOMOT code. The FOMOT code is disclosed in U.S. Pat. No. 4,606,028. When e.g. binary codes are used, such as the code disclosed in U.S. Pat. No. 4,620,311 it is not always possible to obtain all values of the running digital sum at all instants.

A further embodiment of the invention is characterised in that said coded data symbols are binary, in that the number of candidate words of coded data symbols is equal to N/2 if N is even, and in that the number of candidate words of coded symbols is equal to (N+1)/2 if N is odd.

If the coded data symbols are binary the running digital sum will always change after adding a new symbol. In the code according to U.S. Pat. No. 4,620,311 the value of the running digital sum for the candidate words of coded data symbols after adding a symbol differs from all values of the running digital sum of the previous candidate words of coded symbols. If N is even then only N/2 candidate words of coded data symbols are possible. If N is odd, the number of candidate words of coded data symbols toggles between (N+1)/2 and (N−1)/2. Using this recognition it is possible to reduce the number of words of candidate coded symbols substantially, resulting in a decreased complexity of the system.

A further embodiment of the invention is characterised in that the decoder is arranged for increasing the number of candidate sequences by the construction of the candidate sequences after the beginning of a new codeword., or in that the decoder is arranged for decreasing the number of candidate sequences at appending the final symbol to the candidate words of coded symbols.

Some codes have a limited number of values of the running digital sum at the boundaries of words of coded data symbols. In order to deal with such codes the decoder is arranged to increase the number of candidate words of coded data symbols after the beginning of a new word of coded data symbols and/or to decrease the number of candidate words of coded data symbols at appending the final symbol to a candidate words of coded data symbols.

BRIEF DESCRIPTION OF THE DRAWINGS

The present invention will now be explained with reference to the drawings, in which the same elements are indicated with the same reference number.

Herein shows.

DESCRIPTION OF THE PREFERRED EMBODIMENTS

Figure 1:
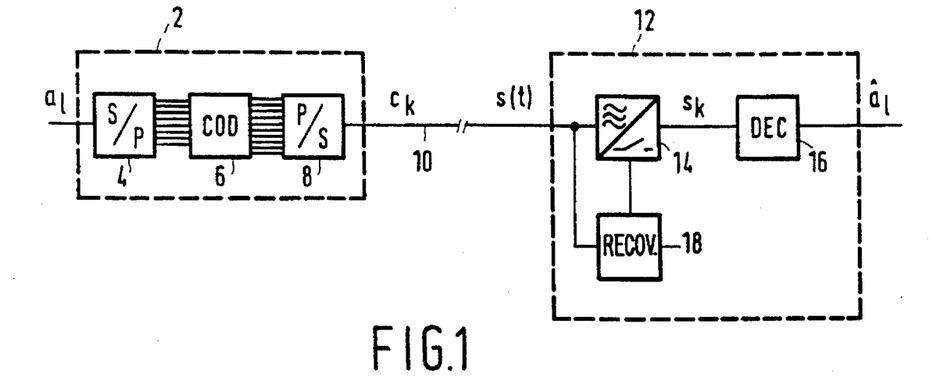
FIG. 1, a transmission system according to the present invention.

In the transmission system according to FIG. 1, the input data symbols $a_l$ are applied to the transmitter 2. In said transmitter 2 the input data symbols $a_1$ are applied to an input of a series to parallel converter 4. The outputs of the series to parallel converter 4 is connected to corresponding inputs of a block coder 6. The outputs of the block coder 6 are connected to inputs of a parallel to series converter 8.

The output of the parallel to series converter 8 carrying output symbols $c_k$ constitutes the output of the transmitter 2.

The output of the transmitter 2 is coupled to an input of the receiver 12 via the transmission channel 12. In the receiver 12, the output signal s(t) of the transmission channel is applied to a sampling circuit 14, and to a clock recovery arrangement 18. An output signal of the clock recovery arrangement 18 is connected to a clock input of the sampling circuit 14. The output of the sampling circuit 14 with output signal $s_k$ is connected to an input of a detector 16. The output of the detector 16, carrying the output data symbols $â_l$.

In the explanation of the transmission system according to FIG. 1 it is assumed the a 8/10 bit block code is used. The input symbols $a_l$ are transformed into words of 8 bits by the series parallel converter 4. The coder 6 transforms the words of 8 bits at its inputs into 10 bit words of coded data symbols at its output. Each of said 10 bits words of coded data symbols is converted into a sequence of data symbols $c_k$ by the parallel series converter 8. The sequence of data symbols $c_k$ constitutes the coded signal.

The output signal s(t) of the transmission channel 10 is filtered and subsequently sampled with a sampling rate proportional to the symbol rate on the transmission channel 10 by the sampling circuit 14. The timing signal for the sampling circuit 14 is derived from the signal s(t) by the timing recovery arrangement 18. The detector 16 derives the words of coded data symbols from the samples $s_k$ according the invention.

Figure 2:
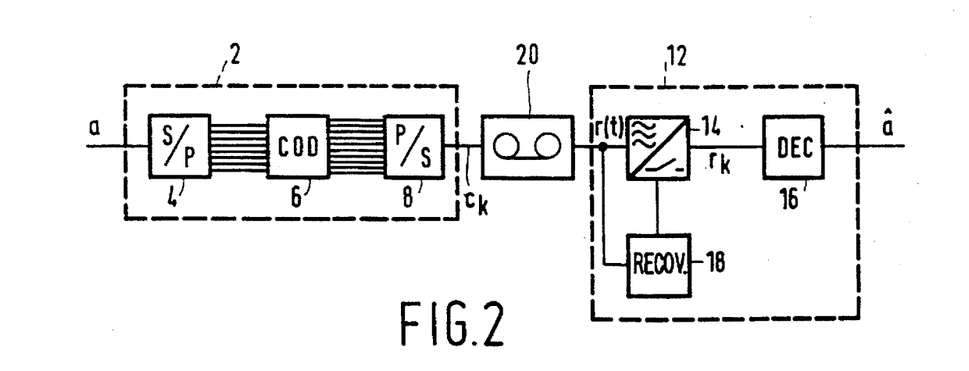
FIG. 2, a recording system according to the present invention.

In the recording system according to FIG. 2, the construction of the transmitter 2 and the receiver 12 is in principle the same as the construction of the transmitter 2 and receiver 12 according to FIG. 1. Only the transmission channel 10 is replaced by a recording and play back arrangement 20. The recording arrangement can comprise a write head energized by the coded data signal which records the coded signal on a magnetic tape. The play back arrangement can comprise a read head which transforms the recorded signal into an electric signal s(t).

Figure 3:
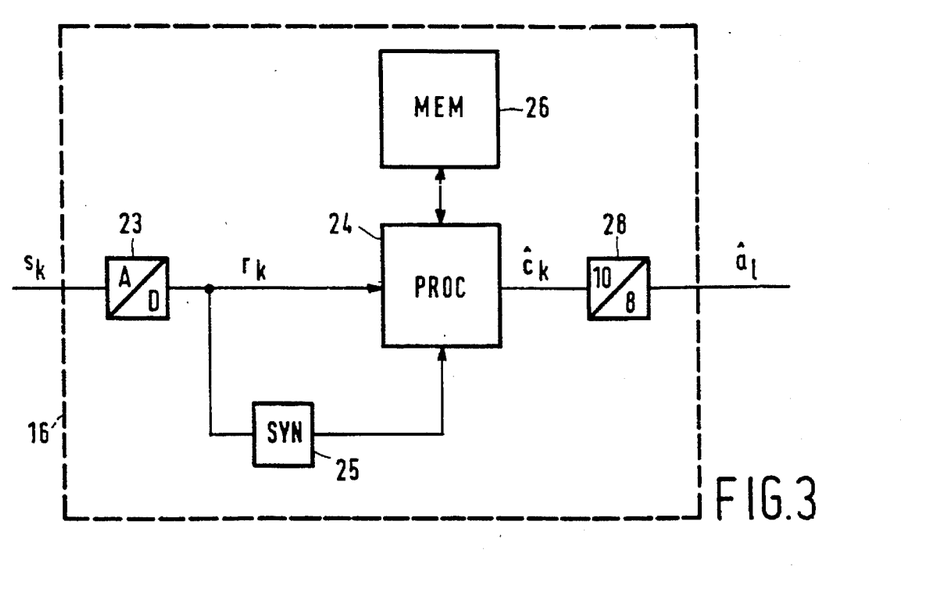
FIG. 3, an implementation of the detector 16 in FIG. 1 and FIG. 2.

In the detector 16 according to FIG. 3 the sampled signal $s_k$ is applied to an analog to digital converter 23. The output of the analog to digital converter 23 with output signal $r_k$ is connected to a first input of a processor 24, and to an input of a word synchroniser 25. An output of the word synchroniser 25 is connected to a second input of the processor 24. The processor 24 is also coupled to a memory unit 26. An output of the processor 24 with output symbols $ĉ_k$ is coupled to a decoder 28. At the output of the decoder 28 the output symbols $â_l$ are available.

The analog samples $s_k$ are transformed into digital samples $r_k$ by means of the analog to digital converter 23. Because the used code is a block code, word synchronisation has to be obtained, to be able to obtain proper detection at the boundaries between two subsequent words. Therefore the word synchroniser detects the presence of a synchronisation word in a preamble of the received data symbols, and generates a reference pulse at the moment the synchronisation word has been detected. This reference pulse is used to initialise the decoding process in the processor 24.

The decoding is performed by the processor 24 under control of a suitable control program which will be discussed later. The memory unit 26 is used to store the control program and the intermediate results needed in the detection process. At an output of the processor 24, symbols $ĉ_l$ of the decoded data. The decoder 28 transforms the words of coded data symbols $ĉ_l$ into a replica $â_l$ of the input symbols.

Figure 4:
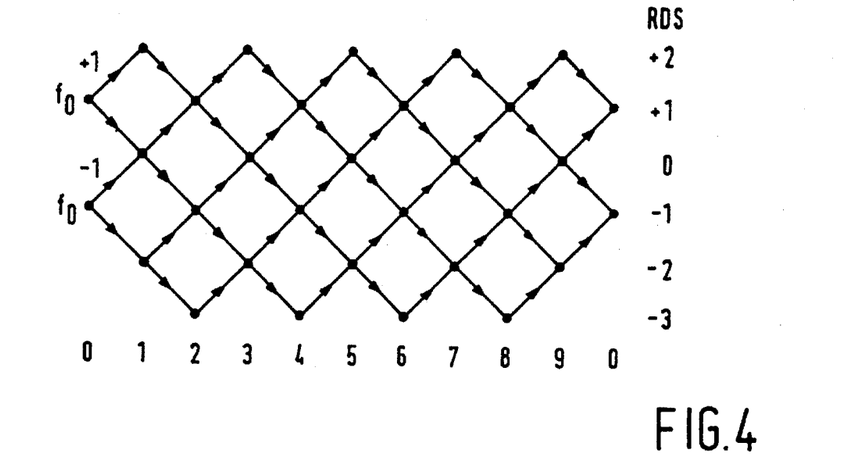
FIG. 4, a trellis diagram of the 8/10 ETM code, used in the systems according FIG. 1 and FIG. 2.

In the trellis according to FIG. 4 it is assumed that the received word of coded data symbols can start from two possible state differing in the value of the running digital sum. Each of the subsequent symbols $\hat{a}_i$ in the word of coded data symbols can assume a value +1 or −1 under the restriction that the running digital sum remains between −3 and +2. At adding the final symbol to a word of coded data symbols, the number of running digital sum values is again reduced to two.

If it is assumed that the likelihood measures of the candidate codeword, also called state metrics of the two originating states are equal to $g_0^{-1}$ and $g_0^{+1}$ respectively (i=0), for the state metrics $g_1^{+2}$, $g_1^0$, and $g_1^{-2}$, (i=1) can be found by adding the corresponding path metric $(r_{i+1}-c_{i+1})^2$ to the state metrics of the originating states:

$$g_1^{+2}=g_0^{+1}+(r_1-1)^2=g_0^{+1}+r_1^2-2r_1+1 \qquad (1)$$

$$g_1^0=\text{MIN}\{g_0^{+1}+(r_1+1)^2,g_0^{-1}+(r_1-1)^2\}=\text{MIN}\{g_0^{+1}+r_1^2+2r_1+1,g_0^{-1}+r_1^2-2r_1+1\} \qquad (2)$$

$$g_1^{-2}=g_0^{-1}+(r_1+1)^2=g_0^{-1}+r_1^2+2r_1+1 \qquad (3)$$

To simplify (1) (2) and (3) the metrics $g_i^x$ are replaced by metrics $f_i^x$. Therefore the relation between $g_i^x$ and $f_i^x$ is defined as:

$$g_i^x = -2f_i^x + \sum_{k=-\infty}^{k=i} r_k^2 + 1 \qquad (4)$$

Using (4), (1), (2), and (3) change into:

$$f_1^{+2}=f_0^{+1}+r_1 \qquad (5)$$

$$f_1^0=\text{MAX}\{f_0^{+1}-r_1,f_0^{-1}+r_1\} \qquad (6)$$

$$f_1^{-2}=f_0^{-1}-r_1 \qquad (7)$$

For the relation between the originating state metrics and the new state metrics for a transition from the states for i is odd to the states for i is even, can be written:

$$g_{i+1}^{+1}=\text{MIN}\{g_i^{+2}+(r_{i+1}+1)^2,g_i^0+(r_{i+1}-1)^2\}$$

$$g_{i+1}^{-3}=g_i^{-2}+(r_{i+1}+1)^2 \qquad (9)$$

$$g_{i+1}^{-1}=\text{MIN}\{g_i^0+(r_{i+1}+1)^2,g_i^{-2}+(r_{i+1}-1)^2\} \qquad (10)$$

Transforming the metrics $g_i^x$ into the metrics $f_i^x$ by using (4) changes (8), (9) and (10) into:

$$f_{i+1}^{+1}=\text{MAX}\{f_i^{+2}-r_{i+1},f_i^0+r_{i+1}\} \qquad (11)$$

For the relation between the state metrics of the originating states and of $$f_{i+1}^{-1}=\text{MAX}\{f_i^0-r_{i+1},f_i^{-2}+r_{i+1}\} \qquad (12)$$

$$f_{i+1}^{-3}=f_i^{-2}-r_{i+1} \qquad (13)$$

the new states for the transition from the states for i is even to the states for i is odd, it can be found in the same way:

$$f_{i+1}^{+2}=f_i^{+1}+r_{i+1} \qquad (14)$$

$$f_{i+1}^0=\text{MAX}\{f_i^{+1}-r_{i+1},f_i^{-1}+r_{i+1}\} \qquad (15)$$

$$f_{i+1}^{-2}=\text{MAX}\{f_i^{-1}-r_{i+1},f_i^{-3}+r_{i+1}\} \qquad (16)$$

For the values of the new state metrics at the transitions from the states for i=9 to the final states (i=10) of the trellis according to FIG. 4 can be written:

$$f_{i+1}^{-1}=\text{MAX}\{f_i^0-r_{i+1},f_i^{-2}+r_{i+1}\} \qquad (17)$$

$$f_{i+1}^{+1}=\text{MAX}\{f_i^{+2}-r_{i+1},f_i^0+r_{i+1}\} \qquad (18)$$

Figure 5:
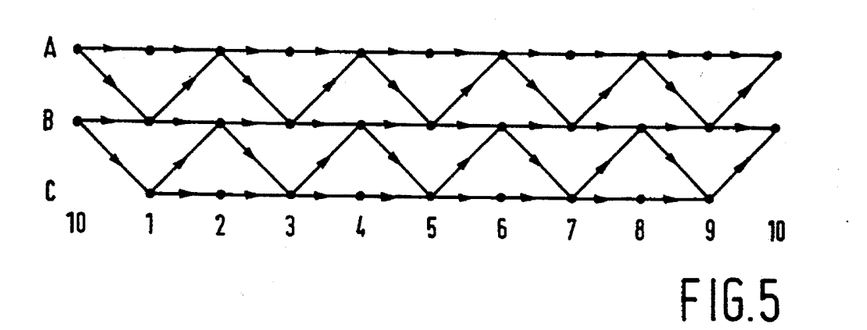
FIG. 5, a reduced state trellis diagram of the 8/10 ETM code, used in the systems according FIG. 1 and FIG. 2.

The trellis according to FIG. 5 is derived from the trellis according to FIG. 4 by transforming the states for i is odd and the states for i is even into new states A, B and C. Using the same derivation as was used in respect of the trellis according to FIG. 4, for the transition between the initial states A, B and the states A, B, and C for i=1, the following path metrics can be found:

$$f_1^A=f_0^A+r_1 \qquad (19)$$

$$f_1^B=\text{MAX}\{f_0^A-r_1,f_0^B+r_1\} \qquad (20)$$

$$f_1^C=f_0^B-r_1 \qquad (21)$$

$$f_{i+1}^A=\text{MAX}\{f_i^A-r_{i+1},f_i^B+r_{i+1}\} \qquad (22)$$

$$f_{i+1}^B=\text{MAX}\{f_i^B-r_{i+1},f_i^C+r_{i+1}\} \qquad (23)$$

$$f_{i+1}^C=f_i^C-r_{i+1} \qquad (24)$$

For the transition from the states for i is odd to the states for i is even, it can be written:
For the transition from the states for i is even to the: states for i is odd, it can be written:

$$f_{i+1}^A=f_i^A+r_{i+1} \qquad (25)$$

$$f_{i+1}^B=\text{MAX}\{f_i^A-r_{i+1},f_i^B+r_{i+1}\} \qquad (26)$$

$$f_{i+1}^C=\text{MAX}\{f_i^B-r_{i+1},f_i^C+r_{i+1}\} \qquad (27)$$

Figure 8:
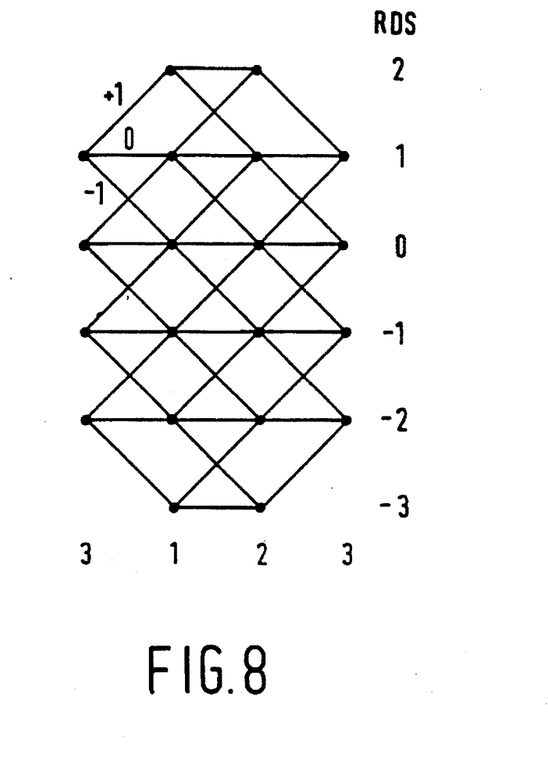
FIG. 8, a trellis diagram for the so called FOMOT code.

For the transitions to the final states (i=10) of the trellis according to FIG. 8 from the states for i=9 can be written:

$$f_{i+1}^A=\text{MAX}\{f_i^A-r_{i+1},f_i^B+r_{i+1}\} \qquad (28)$$

$$f_{i+1}^B=\text{MAX}\{f_i^B-r_{i+1},f_i^C+r_{i+1}\} \qquad (29)$$

Figure 6:
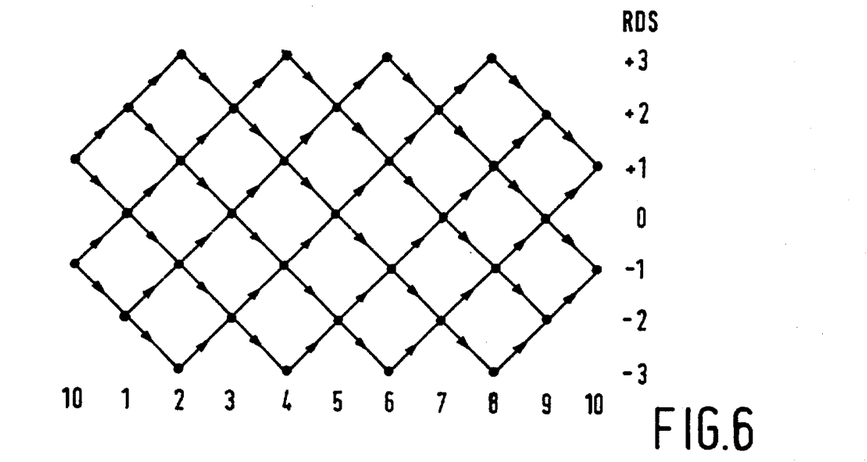
FIG. 6, a trellis diagram of a code having an odd number of possible running digital sum values.

FIG. 6 shows the trellis for a code having an odd number of possible running digital sum values. Due to the similarity with the trellis according to FIG. 4, the expressions for the state metrics are also very similar. They can easily be derived using the method which was explained with respect to the trellis according to FIG. 4.

Figure 7:
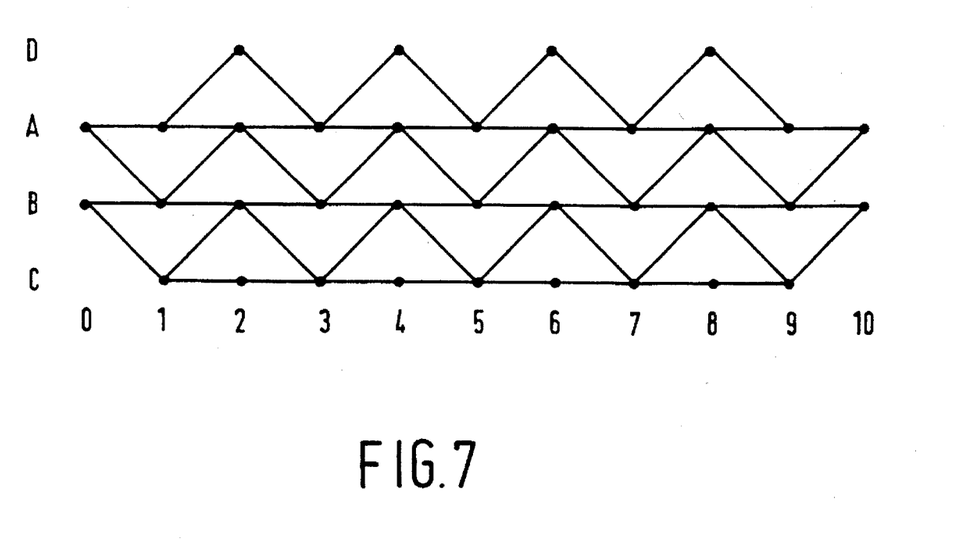
FIG. 7, a reduced state trellis diagram of the code according to the trellis diagram according to FIG. 6.

In the reduced state trellis according to FIG. 7 corresponding to the trellis according to FIG. 6 it can be seen that the number of states for even is one more than the number of states for odd i. Otherwise the trellis of FIG. 7 corresponds to the trellis according to FIG. 5. Consequently the equations for determining the state metrics need to be adapted slightly to take the additional state into account.

In the trellis of the ternary FOMOT code according to FIG. 8 it can be seen that this code has four initial states, and four final stages. The number of intermediate stages is equal to six. From each state a transition to three new states is possible, depending on the value of the appended symbol $\hat{a}_k$ (−1, 0, +1). For the values of the state metrics g at the transition from i=0 to 1 can be written:

$$g_1^{+2}=g_0^{+1}+(r_1-1)^2 \qquad (30)$$

$$g_1^{+1}=\text{MIN}\{g_0^{+1}+r_1^2,g_0^0+(r_1-1)^2\} \qquad (31)$$

$$g_1^0=\text{MIN}\{g_0^{+1}+(r_1+1)^2,g_0^0+r_1^2,g_0^{-1}+(r_1-1)^2\} \qquad (32)$$

$$g_1^{-1}=\text{MIN}\{g_0^0+(r_1+1)^2,g_0^{-1}+r_1^2,g_0^{-2}+(r_1-1)^2\} \qquad (33)$$

$$g_1^{-2}=\text{MIN}\{g_0^{-1}+(r_1+1)^2,g_0^{-2}+r_1^2\} \qquad (34)$$

$$g_1^{-3}=g_0^{-2}+(r_1+1)^2\} \qquad (35)$$

Transforming the metrics $g_i^x$ into the metrics $f_i^x$ using (4) changes (30) to (35) into:

$$f_1^{+2} = f_0^{+1} + r_1 \tag{36}$$

$$f_1^{+1} = MAX\{f_0^{+1} + 0.5, f_0^0 + r_1\} \tag{37}$$

$$f_1^0 = MAX\{f_0^{+1} - r_1, f_0^0 + 0.5, f_1^{-1} + r_1\} \tag{38}$$

$$f_1^{-1} = MAX\{f_0^0 - r_1, f_0^{-1} + 0.5, f_0^{-2} + r_1\} \tag{39}$$

$$f_1^{-2} = MAX\{f_0^{-1} - r_1, f_0^{-2} + 0.5\} \tag{40}$$

$$f_1^{-3} = f_0^{-2} - r_1 \tag{41}$$

For the new values of the state metrics after the transition from i=1 to i=2 easily can be found:

$$f_2^{+2} = MAX\{f_1^{+2} + 0.5, f_2^{+1} + r_2^{+1} + r_2\} \tag{42}$$

$$f_2^q = MAX\{f_1^{q+1} - r_2, f_1^q + 0.5, f_1^{q-1} + r_2\}; -2 \leq q \leq 1 \tag{43}$$

$$f_2^{-3} = MAX\{f_1^{-3} + 0.5, f_2^{-2} - r_2\} \tag{44}$$

For the transitions to the final states (i=3) of the trellis according to FIG. 8 from the states for i=2 can be written:

$$f_3^q = MAX\{f_2^{q+1} - r_3, f_2^q + 0.5, f_2^{q-1} + r_3\}; -2 \leq q \leq 1 \tag{45}$$

It is observed that the expressions derived for the relation between the new state metrics $g_{i+1}^q$ and $g_i^p$ can be expressed in a more general form:

$$q_{i+1}^q = MIN_p[g_i^p + (r_{i+1} - q + p)^2] \tag{46}$$

In (46) p and q are the running digital sum values for the corresponding state metrics. (46) has to be evaluating for all existing combinations of p and q as follows from the trellis diagram. To avoid the necessity of calculation a similar transformation as is given by (4) can be performed.

In the flow diagram according FIG. 9 the instructions have the signification according to the table given below.

Figure 9:
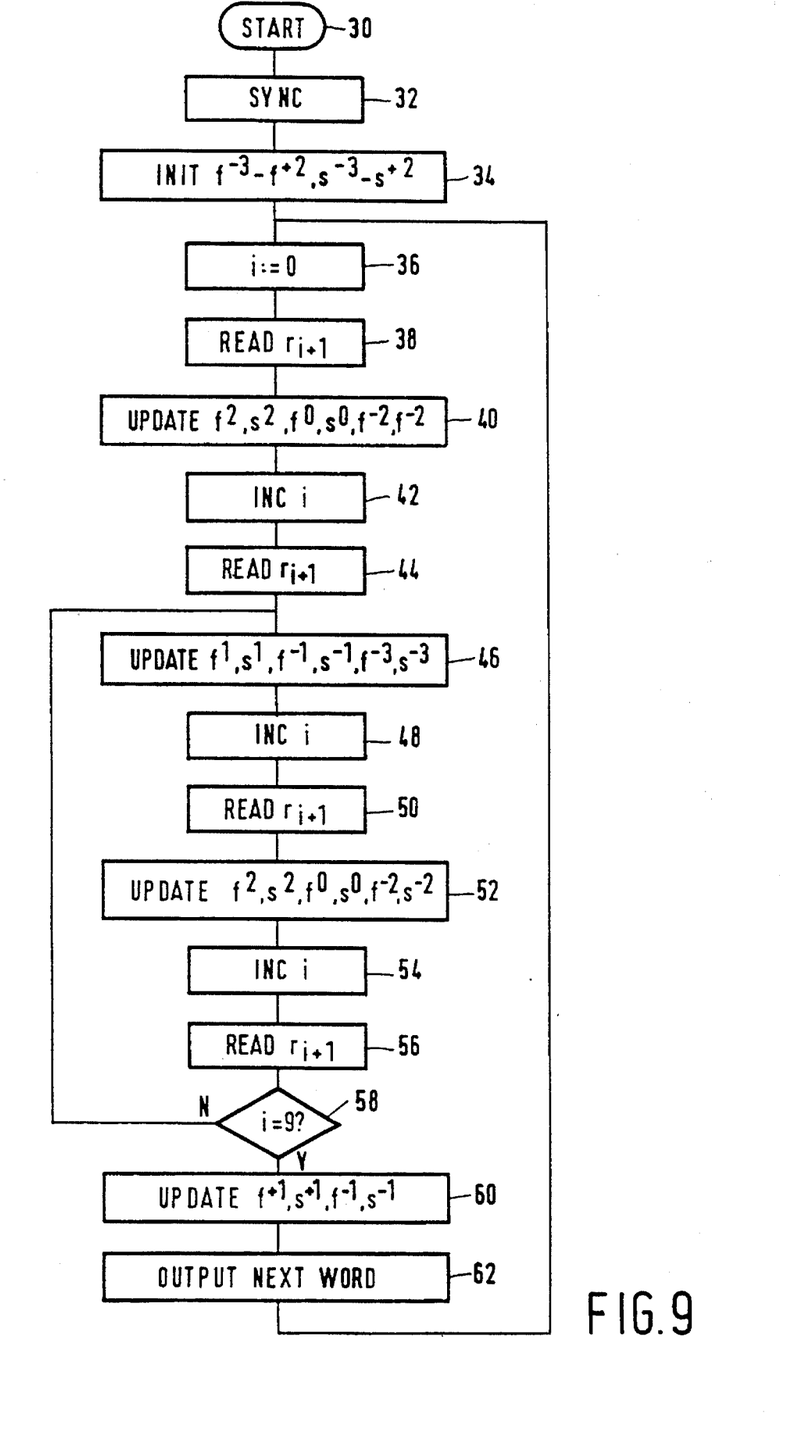
FIG. 9, a flow diagram of a program for the processor 24 to detect a received signal coded using a code having a trellis according to FIG. 4.

The flow diagram according FIG. 9 shows a program to implement a detector for a code having a trellis according to FIG. 4. In the explanation of the flow diagram according to FIG. 9 it is assumed that the variables f correspond to the state metrics, and the variables s correspond to the most likely sequence of symbols leading to said state. The variable f has a single value, and the corresponding variable s is a (finite length) shift register like data structure at which symbol values are appended at updating.

In instruction 30 the program is started. In instruction 32 is waited until the word synchroniser 25 generates a pulse signifying that word synchronisation has been achieved. In instruction all state variables are initialised to a predetermined value, e.g. zero. In instruction 36 a counter i which counts the position in the trellis according to FIG. 4 is set to the value 0. In instruction 38 a value $r_{i+1}$ is read from the A/D converter 23.

In instruction 40, the state metrics $f^2$, $f^0$, and $f^{-2}$ are updated according to (5), (6), and (7). $s^2$ is extended by +1 and $s^{-2}$ is extended by −1. $s^0$ is extended by +1 if the path originating in $F^1$ and ending in $f^0$ is the surviving path. $s^0$ is extended by −1 if the path originating in $f^{+1}$ and ending in $f^0$ is the surviving path. The surviving path is defined as the path trough the trellis whose metric is chosen to be optimal.

In instruction 42 the value of i is incremented, and in instruction 44 the next value of $r_{i+1}$ is read. In instruction 46 the state metrics $f^1$, $f^1$, and $f^3$ are updated according to (11), (12), and (13). $s^1$ is extended by +1 if the path originating in $f^0$ is the surviving path. $s^{-1}$ is extended by −1 if the path originating in $f^{+2}$ and ending in $f^1$ is the surviving path. $s^{-1}$ is extended by +1 if the path originating in $f^2$ is the surviving path, and $s^{-1}$ is extended by −1 if the path originating in $f^0$ is the surviving path. $s^{-3}$ is extended with −1.

In instruction 48 the value of i is incremented, and in instruction 50 the next value of $r_{i+1}$ is read. In instruction 52 the state metrics $f^2$, $f^0$, and $f^{-2}$ are updated according to (14), (15), and (16). $s^{+2}$ is extended by +1. $s^0$ is extended by +1

| Nr. | Inscription | Signification |
|---|---|---|
| 30 | START | Beginning of the program. |
| 32 | SYNC | Acquisition of word synchronisation is obtained. |
| 34 | INIT $f^{-3}$–$f^{+2}$,$s^{-3}$–$s^{+2}$ | The state metrics and the corresponding symbol values are initialised. |
| 36 | i: = 0 | A counter value is set to 0. |
| 38 | READ $r_{i+1}$ | A sample $r_{i+1}$ is read from the A/D converter 23. |
| 40 | UPDATE $f^{+2},s^{+2},f^0,s^0,f^{-2},s^{-2}$ | The relevant state metrics and corresponding symbol values are updated. |
| 42 | i: i+1 | The counter value is increased by 1. |
| 44 | READ $r_{i+1}$ | The next sample $r_{i+1}$ is read from the A/D converter 23. |
| 46 | UPDATE $f^{+1},s^{+1},f^{-1},s^{-1},f^{-3},s^{-3}$ | The relevant state metrics and corresponding symbol values are updated. |
| 48 | i: = i+1 | The counter value is increased by 1. |
| 50 | READ $r_{i+1}$ | The next sample $r_{i+1}$ is read from the A/D converter 23. |
| 52 | UPDATE $f^{+2},s^{+2},f^0,s^0,f^{-2},s^{-2}$ | The relevant state metrics and corresponding symbol values are updated. |
| 54 | i: = i+1 | The counter value is increased by 1. |
| 56 | READ $r_{i+1}$ | A sample $r_{i+1}$ is read from the A/D converter 23. |
| 58 | i = 9 ? | It is tested whether i is equal to 10. |
| 60 | UPDATE $f^{+1},s^{+1},f^{-1},s^{-1}$ | The relevant state metrics and corresponding symbol values are updated. |
| 62 | OUTPUT NEXT WORD | The next detected word is outputted by the processor. | if the path originating in $f^{+1}$ is the surviving path, and $s^{+2}$ is extended by −1 if the path originating in $f^{-1}$ is the surviving path. $s^{-2}$ is extended by +1 if the path originating in $f^{-3}$ is the surviving path, and $s^{-2}$ is extended by −1 if the path originating in $f^1$ is the surviving path.

In instruction 54 the value of i is incremented, and in instruction 56 the next value of $r_{i+1}$ is read. In instruction 58 it is tested whether the value of i is equal to 9. If this is the case, the one but last states of the trellis according, to FIG. 4 has been reached, and the number of states has to be reduced. Otherwise the program is continued at instruction 46.

In instruction 60 the state metrics $f^{+1}$ and $f^{-1}$ are updated according to (17) and (18). $s^1$ is extended by +1 if the path originating in $f^0$ is the surviving path. $s^1$ is extended by −1 if the path originating in $f^{+2}$ is the surviving path. $s^{-1}$ is extended by +1 if the path originating in $F^{-2}$ is the surviving path, and $s^{-1}$ is extended by −1 if the path originating in $f^0$ is the surviving path.

In instruction 62 the next word detected is output. This word contains the last 10 symbol values of one of the data structures s. If the memory length of the data structures s is long enough (a few number of words), the paths trough the trellis tend to merge to only one path having the oldest symbol values in common. These oldest symbol values constitute the outputted word.

In the flow diagram according FIG. 10 the instructions have the signification according to the table given below.

| Nr. | Inscription | Signification |
|---|---|---|
| 64 | START | Beginning of the program. |
| 66 | SYNC | Acquisition of word synchronisation is obtained. |
| 68 | INIT $f^A,s^A,f^B,s^B,f^C,s^C$ | The state metrics and the corresponding symbol values are initialised. |
| 70 | i: = 0 | A counter value is set to 0 |
| 72 | READ $r_{i+1}$ | A sample $r_{i+1}$ is read from the A/D converter 23. |
| 74 | UPDATE$_1$ $f^A,s^A,f^B,s^B,f^C,s^C$ | The relevant state metrics and corresponding symbol values are updated. |
| 76 | i: i+1 | The counter value is increased by 1. |
| 78 | READ $r_{i+1}$ | The next sample $r_{i+1}$ is read from the A/D converter 23. |
| 80 | UPDATE$_E$ $f^A,s^A,f^B,s^B,f^C,s^C$ | The relevant state metrics and corresponding symbol values are updated. |
| 82 | i: = i+1 | The counter value is increased by 1. |
| 84 | READ $r_{i+1}$ | The next sample $r_{i+1}$ is read from the A/D converter 23. |
| 86 | UPDATE$_O$ $f^A,s^A,f^B,s^B,f^C,s^C$ | The relevant state metrics and corresponding symbol values are updated. |
| 88 | i: = i+1 | The counter value is increased by 1. |
| 90 | READ $r_{i+1}$ | A sample $r_{i+1}$ is read from the A/D converter 23. |
| 92 | i = 9 ? | It is tested whether i is equal to 10. |
| 94 | UPDATE $f^A,s^A,f^B,s^B$ | The relevant state metrics and corresponding symbol values are updated. |
| 62 | OUTPUT NEXT WORD | The next detected word is outputted by the processor. |

Figure 10:
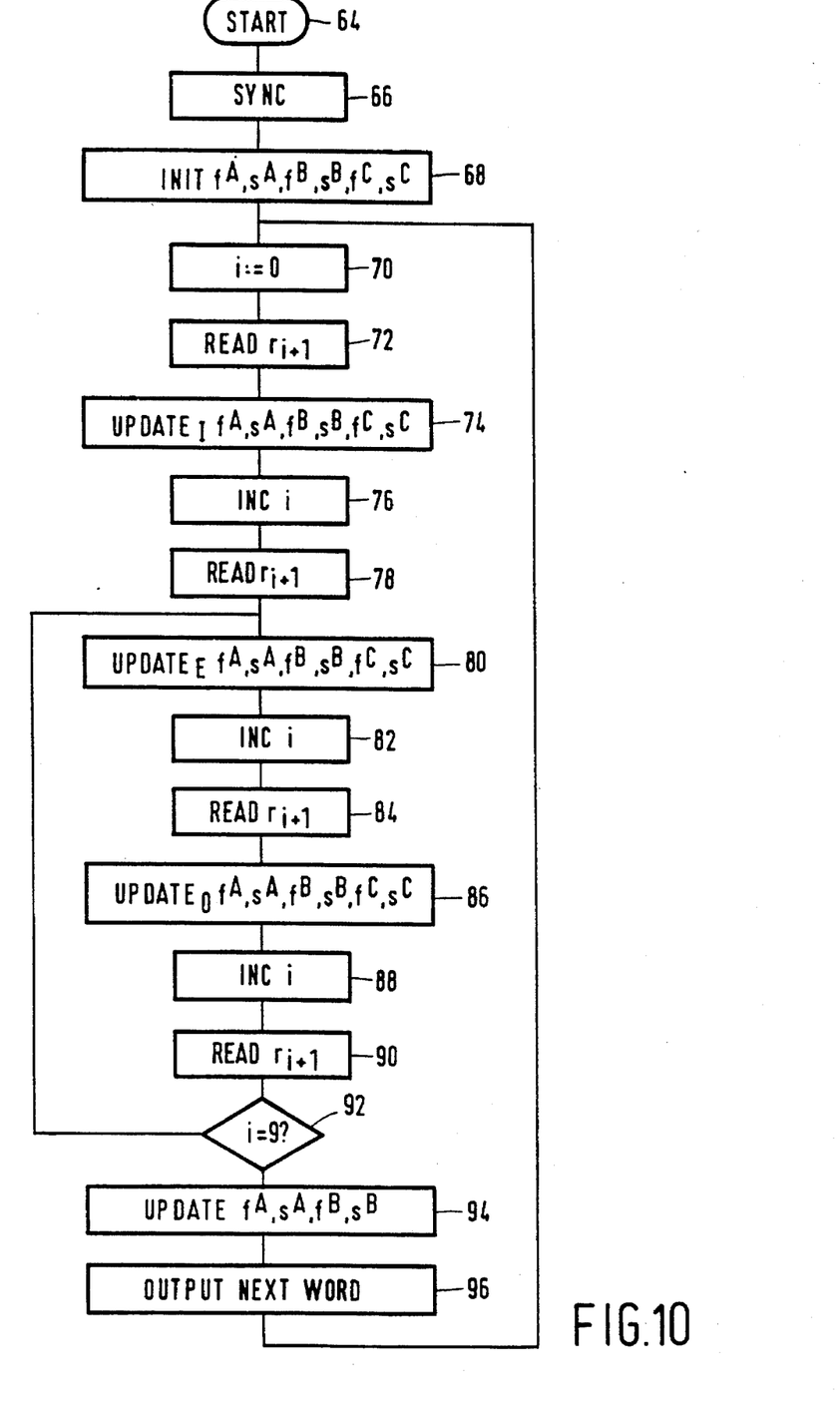
FIG. 10, a flow diagram of a program for the processor 24 to decode a received signal using the reduced state trellis according to FIG. 5.

The flow diagram according FIG. 10 shows a program to implement a detector for a code having a reduced state trellis according to FIG. 5. In the explanation of the flow diagram according to FIG. 10 the same is assumed for the variables f and s corresponding to the flow diagram according to FIG. 9.

In instruction 64 the program is started. In instruction 66 is waited until the word synchroniser 25 generates a pulse signifying that word synchronisation has been achieved. In instruction 68 all state variables are initialised to a predetermined value, e.g. zero. In instruction 70 a counter i which counts the position in the trellis according to FIG. 5 is set to the value 0. In instruction 72 a sample $r_{i+1}$ is read from the A/D converter 23.

In instruction 74, the state metrics $f^A$, $f^B$, and $f^C$ are updated according to (19), (20), and (21). $s^A$ is extended by +1 and $s^C$ is extended by −1. $s^B$ is extended by +1 if the path originating in $f^B$ is the surviving path. $s^B$ is extended by −1 if the path originating in $f^A$ is the surviving path.

In instruction 76 the value of i is incremented, and in instruction 78 the next value of $r_{i+1}$ is read. In instruction 80 the state metrics $f^A$, $f^B$, and $f^C$ are updated according to (22), (23), and (24). $s^A$ is extended by +1 if the path originating in $f^B$ is the surviving path, and $s^A$ is extended by −1 if the path originating in $f^A$ is the surviving path. $s^B$ is extended by +1 if the path originating in $f^C$ is the surviving path, and $s^B$ is extended by −1 if the path originating in $f^B$ is the surviving path. $s^c$ is extended with −1.

In instruction 82 the value of i is incremented, and in instruction 84 the next value of $r_{i+1}$ is read. In instruction 86 the state metrics $f^A$, $f^B$, and $f^C$ are updated according to (25), (26), and (27). $s^A$ is extended by +1. $s^B$ is extended by +1 if the path originating in $F^B$ is the surviving part, and $s^B$ is extended by −1 if the path originating in $f^A$ is the surviving path. $s^C$ is extended by +1 if the path originating in $f^C$ is the surviving path, and $s^C$ is extended by −1 if the path originating in $f^C$ is the surviving path.

In instruction 88 the value of i is incremented, and in instruction 90 the next value of $r_{i+1}$ is read. In instruction 92 it is tested whether the value of i is equal to 9. If this is the case, the one but last states of the trellis according: to FIG. 5 has been reached, and the number of states has to be reduced. Otherwise the program is continued at instruction 80.

In instruction 94 the state metrics $f^A$ and $f^B$ are updated according to (28) and (29). $s^A$ is extended by +1 if the path originating in $f^B$ is the surviving path. $s^1$ is extended by −1 if the path originating in $f^A$ is the surviving path. $s^B$ is extended by +1 if the path originating in $f^C$ is the surviving path, and $s^B$ is extended by −1 if the path originating in $F^B$ is the surviving path.

In instruction 96 the next word detected is output. This word contains the last 10 symbol values of one of the data structures s. Using the reduced state metric results in a saving of memory capacity to store the state metrics and the corresponding sequence of symbols.

In the flow diagram according FIG. 11 the instructions have the signification according to the table given below.

| Nr. | Inscription | Signification |
|---|---|---|
| 98 | START | Beginning of the program. |
| 100 | SYNC | Acquisition of word synchronisation is obtained. |
| 102 | INIT $f^{-2}-f^{+1},s^{-2}-s^{+1}$ | The state metrics and the corresponding symbol values are initialised. |
| 104 | READ $r_{i+1}$ | A sample $r_{i+1}$ is read from the A/D converter 23. |
| 106 | UPDATE $f^{-3}-f^{+2},s^{-3}-s^{+2}$ | The relevant state metrics and corresponding symbol values are updated. |

-continued

| Nr. | Inscription | Signification |
|---|---|---|
| 108 | READ $r_{i+1}$ | The next sample $r_{i+1}$ is read from the A/D converter 23. |
| 110 | UPDATE $f^{-3}-f^{+2}, s^{-3}-s^{+2}$ | The relevant state metrics and corresponding symbol values are updated. |
| 112 | READ $r_{i+1}$ | The next sample $r_{i+1}$ is read from the A/D converter 23. |
| 114 | UPDATE $f^{-2}-f^{+1}, s^{-2}-s^{+1}$ | The relevant state metrics and corresponding symbol values are updated. |
| 62 | OUTPUT NEXT WORD | The next detected word is outputted by the processor. |

Figure 11:
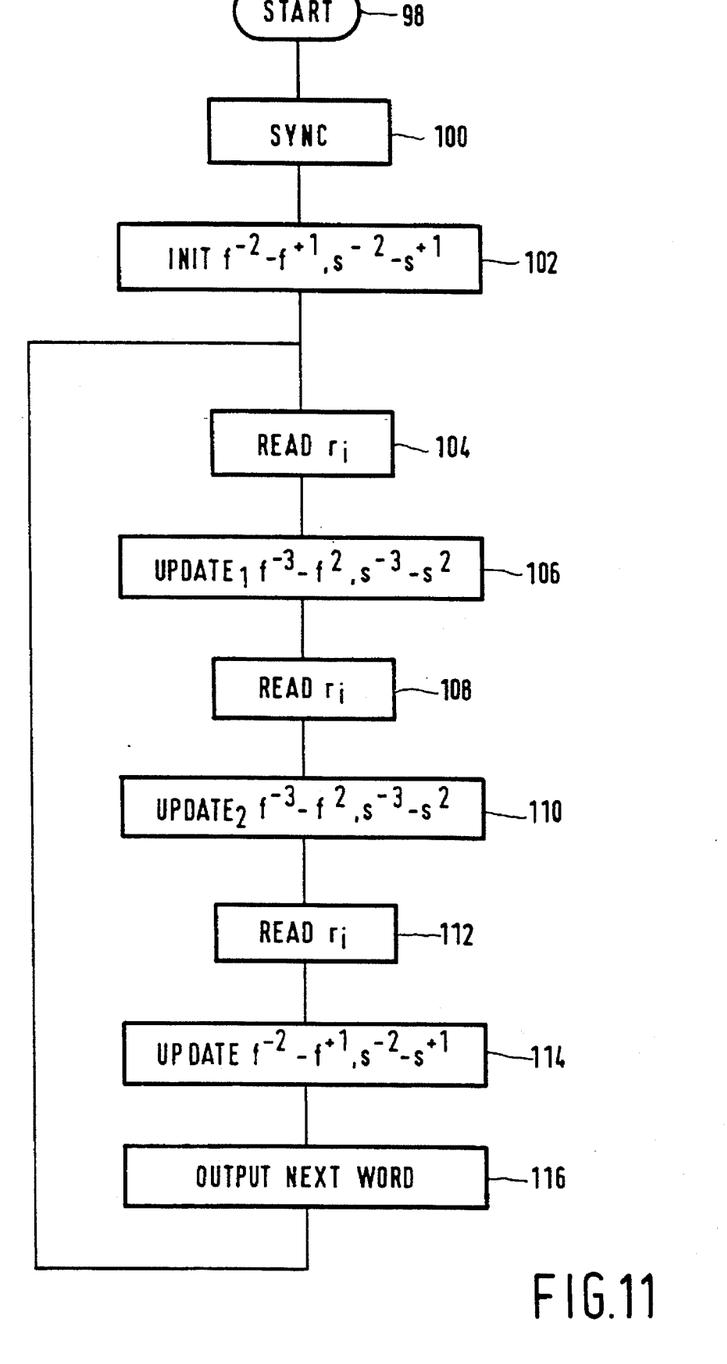
FIG. 11, a flow diagram of a program for the processor 24 to decode a received signal coded using the FOMOT code having a trellis according to FIG. 8.

The flow diagram according FIG. 11 shows a program to implement a detector for the ternary FOMOT code having a trellis according to FIG. 8. In instruction 98 the program is started. In instruction 100 is waited until the word synchroniser 25 generates a pulse signifying that word synchronisation has been achieved. In instruction 102 all state variables are initialised to a predetermined value, e.g. zero. In instruction 104 a value $r_{i+1}$ is read from the A/D converter 23.

In instruction 106, the state metrics $f^2$, $f^1$, $f^0$, $f^1$, $f^2$ and $f^3$ are updated according to (36), (37), (38), (39), (40) and (41). $s^2$ is extended by +1 and $s^{-3}$ is extended by −1. $s^1$ is extended by 0 if the surviving path originates in $f^1$ and is extended by +1 if the surviving path originates in $f^0$. $s^0$ is extended by +1 if the path originating in $f^{-1}$ is the surviving path, $s^0$ is extended by −1 if the path originating in $f^{+1}$ is the surviving path and $s^0$ is extended by 0 if the path originating at $f^0$ is the surviving path.

$s^{-1}$ is extended by +1 if the path originating in $f^{-2}$ is the surviving path, $s^{-1}$ is extended by −1 if the path originating in $f^0$ is the surviving path and $s^{-1}$ is extended by 0 if the path originating at $f^{-1}$ is the surviving path. $s^{-2}$ is extended by 0 if the surviving path originates in $f^{-2}$ and is extended by −1 if the surviving path originates in $f^{-1}$.

In instruction 108 the next value of $r_{i+1}$ is read. In instruction 110 the state metrics $f^3-f^{+2}$ are updated according to (42), (43), and (44). $s^2$ is extended by +1 if the path originating in $f^1$ is the surviving path, and $s^1$ is extended by 0 if the path originating in $f^{+2}$ is the surviving path. For q having values −2, −1,0, +1 $s^q$ is extended by +1 if the path originating in $f^{q-1}$ is the surviving path, $s^q$ is extended by −1 if the path originating in $f^{q+1}$ is the surviving path and $s^q$ is extended by 0 if the path originating at $f^q$ is the surviving path. $s^{-3}$ is extended by −1 if the path originating in $f^{-2}$ is the surviving path, and $s^{-3}$ is extended by 0 if the path originating in $f^{-2}$ is the surviving path.

In instruction 112 the next value of $r_{i+1}$ is read. In instruction 114 the state metrics $f^2$, $f^{-1}$, $f^0$, $f^{+1}$ and $f^{+2}$ are updated according to (45). For q having values −2, 1,0, +1 $s^q$ is extended by +1 if the path originating in $f^{q-1}$ is the surviving path, $s^q$ is extended by −1 if the path originating in $f^{q-1}$ is the surviving path and $s^q$ is extended by 0 if the path originating at $f^q$ is the surviving path.

In instruction 116 the next word detected is output. This word contains the last 10 symbol values of one of the data structures s. If the memory length of the data structures s is long enough (a few number of words), the paths trough the trellis tend to merge to only one path having the oldest symbol values in common. These oldest symbol values constitute the outputted word.

It is observed that the invention is described by referring to a detector having an sapled continuous input signal $r_i$. It is conceivable that the invention is applied to a decoder having as input signal a hard limited version of the signal $r_i$.

I claim:

1. Transmission system comprising a transmitter (2) for deriving words of coded data symbols from input data symbols, and for applying a coded signal derived from the words of coded data symbols to a transmission channel (10), a receiver (12) for receiving the coded signal from the transmission channel comprising a decoder (16) for deriving said words of coded data symbols from the received coded signal, characterised in that the decoder (16) is arranged for determining a most likely word of coded data by symbol wise expanding candidate words of coded data symbols using likelihood measures corresponding to each of said candidate words of coded data symbols, each likelihood measure being derived from the received coded signal, running digital sum (RDS) of the coded data symbols, produced by adding the coded data symbols, is bounded between a finite minimum (−1) and maximum value (+2), whereby said coded data symbols are binary, the value of the running digital sum always changing to a value not occurring among candidate words of coded data symbols before being expanded whereby the number of candidate words of coded data symbols equal to N/2 if N is even, and in that the number of candidate words of coded symbols is equal to (N+1)/2 if N is odd, N being the number of possible running digital sum values.

2. Transmission system according to claim 1, characterised in that the decoder (16) is arranged for increasing the number of candidate sequences by the construction of the candidate sequences after the beginning of a new codeword.

3. Transmission system according to claim 1, characterised in that the decoder (16) is arranged for decreasing the number of candidate sequences at appending the final symbol to the candidate words of coded symbols.

4. Recording system comprising a transmitter (2) for deriving words of coded data symbols from input data symbols, and for applying a coded signal derived from the words of coded data symbols to a recording medium (20), a receiver (12) for receiving a coded signal from the recording medium (20), said receiver comprising a decoder (16) for deriving said words of coded data symbols from the received coded signal, characterised in that the decoder (16) is arranged for determining a most likely word of coded data by symbol wise expanding candidate words of coded data symbols using likelihood measures corresponding to each of said candidate words of coded data symbols, each likelihood measure being derived from the received coded signal, a running digital sum (RDS) of the coded data symbols, produced by adding the coded data symbols, is bounded between a finite minimum (−1) and maximum value (+2), whereby said coded data symbols are binary, the value of the running digital sum always changing to a value not occurring among candidate words of coded data symbols before being expanded whereby the number of candidate words of coded data symbols is equal to N/2 if N is even, and in that the number of candidate words of coded symbols is equal to (N+1)/2 if N is odd, N being the number of possible running digital sum values.

5. Receiver (12) for receiving a block coded signal, said receiver (12) comprising a decoder (16) for deriving said words of coded data symbols from the received coded signal, characterised in that the decoder (16) is arranged for determining a most likely word of coded data by symbol wise expanding candidate words of coded data symbols using likelihood measures corresponding to each of said candidate words of coded data symbols, each likelihood measure being derived from the received coded signal, a running digital sum (RDS) of the coded data symbols, produced by adding the coded data symbols, is bounded between a finite minimum (−1) and maximum value (+2), whereby said coded data symbols are binary, the value of the running digital sum always changing to a value not occurring among candidate words of coded data symbols before being expanded whereby the number of candidate words of coded data symbols is equal to N/2 if N is even, and in that the number of candidate words of coded symbols is equal to (N+1)/2 if N is odd, N being the number of possible running digital sum values.

6. Recording system according to claim 4, characterised in that the decoder (16) is arranged for increasing the number of candidate sequences by the construction of the candidate sequences after the beginning of a new codeword.

7. Recording system according to claim 6, characterised in that the decoder (16) is arranged for decreasing the number of candidate sequences at appending the final symbol to the candidate words of coded symbols.

8. Receiver according to claim 5, characterised in that the decoder (16) is arranged for increasing the number of candidate sequences by the construction of the candidate sequences after the beginning of a new codeword.

9. Receiver according to claim 8, characterised in that the decoder (16) is arranged for decreasing the number of candidate sequences at appending the final symbol to the candidate words of coded symbols.

* * * * *